(12) United States Patent
Szumla et al.

(10) Patent No.: US 7,050,197 B1
(45) Date of Patent: May 23, 2006

(54) IMAGE PROCESSOR FOR HIGH-SPEED PRINTING APPLICATIONS

(75) Inventors: Thomas P. Szumla, Lockport, NY (US); Manh Tang, Penfield, NY (US); Edward A. Hauschild, Pittsford, NY (US); Douglas W. Couwenhoven, Fairport, NY (US); David A. Johnson, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1104 days.

(21) Appl. No.: 09/662,253

(22) Filed: Sep. 14, 2000

(51) Int. Cl.
*G06F 15/00* (2006.01)
*G06F 13/00* (2006.01)
*G06F 13/14* (2006.01)

(52) U.S. Cl. ........................ 358/1.9; 358/1.15; 710/305
(58) Field of Classification Search ................ 358/1.9, 358/515, 518, 523, 520, 1.15, 468, 444, 442; 382/167, 162; 710/27, 305, 100; 370/257, 370/364, 365, 438, 423
See application file for complete search history.

(56) References Cited

U.S. PATENT DOCUMENTS

| | | | | |
|---|---|---|---|---|
| 4,467,447 A * | 8/1984 | Takahashi et al. | ............. | 710/27 |
| 4,583,160 A * | 4/1986 | Iguma | ......................... | 710/107 |
| 4,750,111 A * | 6/1988 | Crosby et al. | .................. | 710/58 |
| 5,046,023 A * | 9/1991 | Katsura et al. | ............. | 345/619 |
| 5,113,494 A * | 5/1992 | Menendez et al. | .......... | 345/502 |
| 5,237,567 A * | 8/1993 | Nay et al. | .................... | 370/438 |
| 5,237,655 A | 8/1993 | Statt et al. | | |
| 5,257,097 A * | 10/1993 | Pineau et al. | ............... | 358/500 |
| 5,262,875 A | 11/1993 | Mincer et al. | | |
| 5,282,269 A * | 1/1994 | Willems et al. | ............. | 345/545 |
| 5,412,488 A * | 5/1995 | Ogata | ......................... | 358/437 |
| 5,434,983 A * | 7/1995 | Yaso et al. | .................... | 710/110 |
| 5,485,287 A * | 1/1996 | Nakamura et al. | ..... | 358/426.02 |
| 5,717,875 A * | 2/1998 | Cutlerywala et al. | ....... | 710/315 |
| 5,727,171 A * | 3/1998 | Iachetta, Jr. | ................ | 710/107 |
| 5,740,377 A * | 4/1998 | Sonobe | ........................ | 710/301 |
| 5,761,565 A * | 6/1998 | Baker et al. | .................... | 399/2 |
| 5,796,411 A | 8/1998 | Cyman et al. | | |
| 5,828,814 A | 10/1998 | Cyman et al. | | |
| 5,875,311 A * | 2/1999 | Bertram et al. | ............. | 710/305 |
| 5,899,604 A * | 5/1999 | Clark | ......................... | 399/223 |
| 5,905,802 A * | 5/1999 | Megeid | ....................... | 381/108 |

(Continued)

*Primary Examiner*—Madeleine Av Nguyen
(74) *Attorney, Agent, or Firm*—Norman Rushefsky; Mark G. Bocchetti (57) ABSTRACT

An image processor (14) supporting very high-speed printing. The image processor (14) preferably has two separate connections to a source (12) of the image being printed, e.g., a printer control bus (34) and an image data bus (36). The image processor (14) preferably accepts images from the image source (12) in commonly known graphics file formats, such as the well-known 24-bit, uncompressed TIFF file format. The image processor (14) is a multiprocessor implementation. Preferably, one processor (30) coordinates or "orchestrates" control of the printing system and handshaking with the image source via the printer control bus (34) and the other processor (32) functions as a raster image processor (RIP) processor (52) and accepts and stores images into the printer environment from the image source (12) via the image data bus (36). The RIP processor (52) preferably performs color separation on the image into color planes and transmits each color plane to a separate processing path from that point on in the imaging chain. Each color plane preferably has a separate imaging path out from a shared image data bus (62). This separate path for each color plane preferably includes a band manager (54), a print engine or nozzle controller (60), and a print head (58).

24 Claims, 8 Drawing Sheets

U.S. PATENT DOCUMENTS

| | | | |
|---|---|---|---|
| 5,905,852 A | 5/1999 | Love et al. | |
| 5,984,446 A | 11/1999 | Silverbrook | |
| 6,006,015 A * | 12/1999 | Bender et al. | 358/1.18 |
| 6,081,347 A * | 6/2000 | Yasuda | 358/400 |
| 6,085,278 A * | 7/2000 | Gates et al. | 710/263 |
| 6,181,341 B1 * | 1/2001 | Shinagawa | 715/734 |
| 6,202,116 B1 * | 3/2001 | Hewitt | 710/305 |
| 6,229,620 B1 * | 5/2001 | Makitani et al. | 358/1.15 |
| 6,229,622 B1 * | 5/2001 | Takeda | 358/1.16 |
| 6,231,155 B1 * | 5/2001 | Udagawa et al. | 347/19 |
| 6,236,463 B1 * | 5/2001 | Cyman et al. | 358/1.14 |
| 6,282,592 B1 * | 8/2001 | Aston et al. | 710/100 |
| 6,425,041 B1 * | 7/2002 | Klein | 710/306 |
| 6,502,159 B1 * | 12/2002 | Chuang et al. | 710/316 |
| 6,560,692 B1 * | 5/2003 | Kudo et al. | 712/23 |
| 6,587,735 B1 * | 7/2003 | Yaguchi | 700/2 |
| 6,604,151 B1 * | 8/2003 | Date et al. | 710/14 |
| 6,714,312 B1 * | 3/2004 | Hidaka | 358/1.15 |
| 6,714,673 B1 * | 3/2004 | Ohta | 382/167 |
| 6,735,207 B1 * | 5/2004 | Prasad et al. | 370/395.7 |
| 6,778,291 B1 * | 8/2004 | Clouthier | 358/1.16 |
| 6,804,020 B1 * | 10/2004 | Kuroda | 358/1.15 |
| 6,850,995 B1 * | 2/2005 | Shishizuka et al. | 710/20 |
| 2001/0015818 A1 * | 8/2001 | Kawanabe et al. | 358/1.15 |
| 2004/0260983 A1 * | 12/2004 | Leung et al. | 714/48 |

* cited by examiner

IMAGE PROCESSOR FOR HIGH-SPEED PRINTING APPLICATIONS

FIELD OF THE INVENTION

The present invention relates generally to the field of printing devices, and more specifically to a high-speed image processor for use with high speed printing applications, such as high-volume photograph printing in a photograph processing laboratory or as would be associated with large-format printing such as printing wallpaper or product packaging.

BACKGROUND OF THE INVENTION

High-speed printers are being used for more and more high-speed, high-volume printing applications. For example, high-speed ink jet printers are currently being used to print photographic prints in photograph processing laboratories. A single photographic print can require on the order of ten or more megabytes of image data. In photograph processing laboratories multiple photographs are typically printed simultaneously. Thus, the photographic processing application, and other applications, require printers capable of accepting, processing, and printing huge amounts of data. As the speed and scale of these applications increase, the image processor tends to be a bottleneck as it tries to keep up with the rest of the system.

There is a need, therefore, for an improved image processor architecture to rapidly process the vast amounts of data required in high-speed, high-volume printing applications such as photographic processing and the like.

SUMMARY OF THE INVENTION

The present invention is directed toward an image processor supporting very high-speed printing. According to one aspect of the present invention, the image processor has two separate connections to the source of the image being printed, e.g., an image data path and a control/status path. The image processor of the present invention preferably accepts images from the image source in commonly known graphics file formats, such as the well-known 24-bit, uncompressed TIFF file format. This greatly facilitates use of the image processor with virtually any image source capable of downloading an image in one of the common file formats.

According to another aspect of the present invention, the image processor is a multiprocessor implementation. Preferably, one processor coordinates or "orchestrates" control of the printing system and handshaking with the image source via the control/status path and the other processor functions as a raster image processor (RIP) processor and accepts and stores images into the printer environment from the image source via the image data path.

According to yet another aspect of the present invention, the RIP processor preferably performs color separation on the image into color planes and transmits each color plane to a separate processing path from that point on in the imaging chain. Each color plane preferably has a separate imaging path out from a shared image data bus. This separate path for each color plane preferably includes a band manager, a print engine, and a print head. This architecture allows concurrent data movement through the image processor to the print head for maximum printing productivity. The architecture also allows optimization of specific processing algorithms by specific processors, depending on whether the algorithm is best applied to the entire image or best applied to a single color plane.

The shared image data bus used by the RIP processor to transmit color-separated image data to each color plane's band manager is preferably a shared (i.e., common) multi-slot parallel I/O type data bus, e.g., VMEbus and Compact-PCI Bus, and future buses. The architecture of the present invention is structured so that it is not bus-specific, so that the design can be carried forward in the future as new bus technologies evolve and old ones become obsolete.

It is therefore an advantage of the present invention to provide an image processor providing high-speed image processing for printing.

It is also an advantage of the present invention to provide an image processor having two separate communications paths to an image source, preferably an image data path and a control/status path.

It is another advantage of the present invention to provide an image processor having at least two processors in circuit communication with an image source, preferably a first processor in circuit communication with an image source via the image data path and a second processor in circuit communication with the image source via the control/status path.

It is a further advantage of this invention to provide an image processor capable of accepting from an image source graphics files in common graphics file formats, such as the well-known 24-bit, uncompressed TIFF file format.

It is yet another advantage of the present invention to provide an image processor that has a raster image processor that performs color separation of the image data into color planes corresponding to print and transmits the separated color-plane data to a plurality of color plane processors, each having its own processing path.

It is still another advantage of the present invention to provide an image processor having a plurality of color plane processors in circuit communication with a raster image processor via a common multi-slot parallel I/O type data bus.

It is yet still another advantage of the present invention to provide an image processor having an electronic architecture that is universal in the sense that it is not intimately tied to a particular embedded processor or computer data bus architecture.

It is yet still another advantage of the present invention to provide an image processor allowing optimization of specific processing algorithms by specific processors, depending on whether the algorithm is best applied to the entire image or best applied to data for a single color plane.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to example the principles of this invention, wherein.

DETAILED DESCRIPTION OF THE INVENTION

Figure 1:
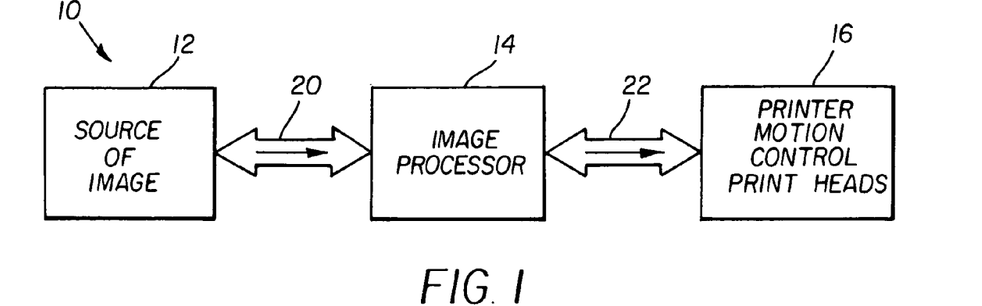
FIG. 1 is a high level block diagram showing generally how the image processor of the present invention interrelates with other portions of the printing system.

Referring to FIG. 1, there is shown a printing system 10 having an image source 12, an image processor 14, and a printer 16. The printer 16 comprises a motion control portion and print heads (not shown in FIG. 1). The present invention is directed to the image processor 14 at a very high, system architecture level. A primary application of this type of printing system 10 is the application of high-speed printing of photographs from digitized photographic images in a high-speed photo processing laboratory. However, it's application is not limited solely to the rendering of photographic prints. The present invention can also be used in applications such as the printing of wallpaper, large format graphics, such as banners, and other printing applications that would benefit from the increased graphics processing speed and other advantages of the present invention. The image source 12 is in circuit communication with the image processor 14 via at least one bus 20 and the image processor is in circuit communication with the printer via at least one bus 22. In the figures herein, arrow heads at the end of a bus refer more to the nature of the bus and less to the path of information being passed via that bus, while arrows inside hollow buses refer more to the path of information being passed via that bus. Thus, buses 20, 22 are preferably bi-directional buses (arrow heads at both ends of the buses), and image data is shown as taking a path from left to right (arrows inside the buses are from left to right). "Circuit communication" as used herein indicates a communicative relationship between devices. Direct electrical and optical connections and indirect electrical and optical connections are examples of circuit communication. Two devices are in circuit communication if a signal from one is received by the other, regardless of whether the signal is modified by some other device. For example, two devices separated by one or more of the following—transformers, optoisolators, digital or analog buffers, analog integrators, other electronic circuitry, fiber optic transceivers, or even satellites—are in circuit communication if a signal from one is communicated to the other, even though the signal is modified by the intermediate device(s). As a final example, two devices not directly connected to each other, but both capable of interfacing with a third device, e.g., a CPU, are in circuit communication. As used herein, "input" refers to either a signal or a value and "output" refers to either a signal or a value.

The image source 12 provides digital files representing an image to the image processor 14. In the context of this architecture-level patent, virtually any source of a digital file representing an image, preferably a contone image, will suffice for the image source 12. That said, the image source 12 is preferably a photograph preprocessing system such as Kodak® Digital Lab System. The image source 12 preferably outputs to the image processor 14, and the image processor 14 accepts and processes for printing, digitized images in a common file format representing graphical images, e.g., the 24-bit, uncompressed TIFF file format. These digitized images (not shown) can be generated by the image source 12, e.g., by scanning or otherwise digitizing a photograph or photographic negative. The images can be either monochrome (e.g., black and white) or color (e.g., RGB) and preferably are in a pixelized format, as compared to a vector, or graphics descriptor language or script type language or other format. Other sources of images 12 include computer networks, so-called disk farms, the Internet, etc.

Printer 16 marks a medium with an image. Although in the context of this architecture-level patent virtually any printer using any technology can be used to print the image processed by the image processor 14 of the present invention, e.g., ink jet or dye sublimation, the printer 16 is preferably a multi-head ink jet printer, which are known to those skilled in the art.

Figure 2:
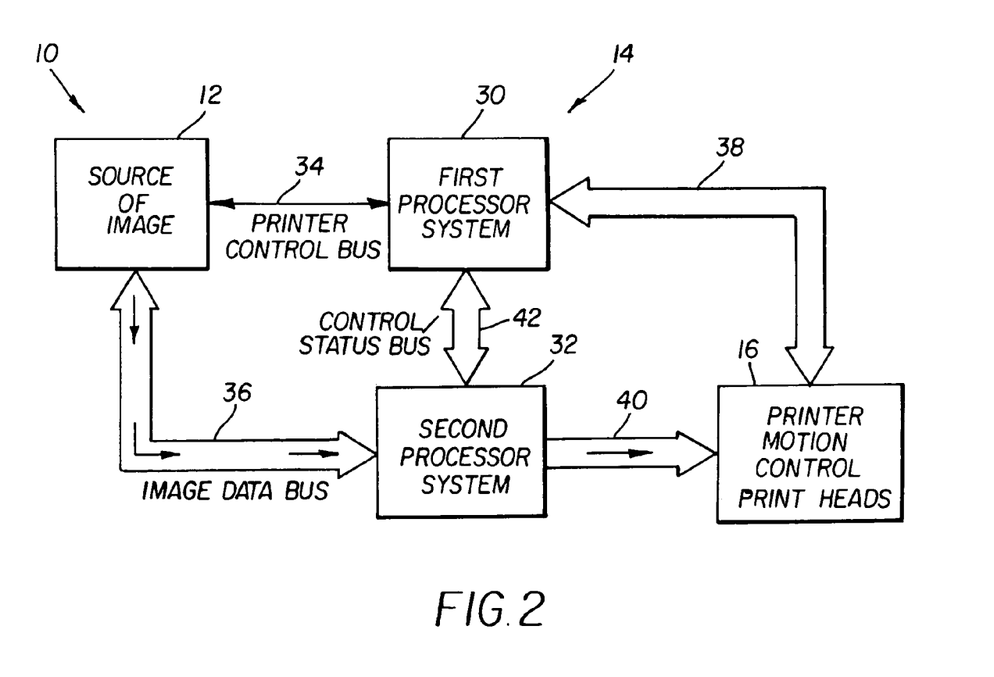
FIG. 2 is a high-level block diagram showing the first and second processor systems of the image processor of the present invention.

One advantage of the present invention is that the image processor 14 of the present invention has a printer image data path that is separate from its printer control and status path. Referring now to FIG. 2, at the highest level, the image processor 14 of the present invention preferably comprises a first processor system 30 and a second processor system 32. The first processor system 30 is characterized by providing high-level control of the image processing performed within the image processor 14. The first processor system 30 also preferably provides high-level control of image acquisition performed by image processor 14, e.g., handshaking during image transfers from image source 12 to second processor system 32, and high level control for the printer 16. Thus, this first processor system 30 preferably coordinates or orchestrates control of image acquisition and image printing. The second processor system 32 is characterized by performing a majority of the image processing performed within the image processor 14 responsive to control by the first processor system 30. The second processor system 32 also preferably accepts and stores images from the image source 12, as coordinated by the first processor system 30. The image processing performed by the second processing system 32 includes one or more of the following functions: color separation (e.g., separation into CMY or CMYK or CMYKcm color planes, with each color plane typically corresponding to a specific color of ink or other marking medium in the printer), image sharpening (adjusting the sharpness of edges by applying a convolution filter, print masking (firing alternate ink nozzles to minimize ink bleeding and/or coalescence), image resizing (interpolating intermediate pixels to increase the size of an image), ink depletion (clipping or otherwise limiting the amount of ink needed to produce an acceptable print, e.g., to prevent the printer from soaking the print medium), printer calibration (to linearize printer response to the full range of image data values), printer color conversion (converting the color space of the image to the color space of the printer, e.g., by color mapping), dithering (e.g., half-toning or multi-toning), registration correction (e.g., aligning misaligned, separate print heads by shifting rows of pixels), and failed nozzle correction (e.g., identifying a clogged nozzle and causing an unclogged nozzle to fire in place of the clogged nozzle). These image processing functions and their respective implementations are known to those of ordinary skill in the art. The specific algorithms and methods used to implement these image processing functions are not of significance in the present system architecture-level invention; what is important in the context of the present system architecture-level invention is generally where each image processing function is implemented, as set forth below.

The first processor system 30 is in circuit communication with the image source 12 via at least one bus, preferably a print control bus 34. The print control bus can be virtually a bus of virtually any protocol; speed of transfer is not critical for the print control bus 34. Suitable buses for the print control bus 34 include a 100 megabit per second Ethernet data link and a Fibre Channel link, both of which are known to those skilled in the art. The second processor system 32 is in circuit communication with the image source 12 via at least one bus, preferably an image data bus 36. Although virtually any bus protocol can be used for the image data bus 36, because image files can be very large (e.g., 11.53 megabytes for a 4 by 6 inch CYM 400-dpi TIFF image), speed of transfer is important between the image source 12 and the second processor system 32 along that bus. Therefore, faster buses are preferred for the image data bus 36, such as VMEbus, CompactPCI Bus, the proposed VME640 bus, other low voltage differential signaling (LVDS) parallel input/output (I/O) buses, and other high-speed parallel buses. The CompactPCI bus is currently preferred for image data bus 36.

Printer control and status information preferably travels between the image source 12 and the first processor system 30 via the printer control bus 34. Printer image data preferably travels between the image source 12 and the second processor system via the image data bus 36. Thus, there are independent processors for control and image processing, each having a separate and dedicated communication path with the image source 12. The separate processors and separate paths for printer image data and printer control and status data allow the system to minimize the "housekeeping" performed by the processor system performing the image processing, thereby streamlining image processing and increasing the speed of high-speed printing.

Additionally, the first processor system 30 is preferably in circuit communication with the printer 16 via at least one bus 38 and the second processor system 32 is preferably in circuit communication with the printer 16 via at least one bus 40. The exact nature of these buses will depend on the particular technology of the printer 16 selected and whether or not there are, for example, nozzle controllers in the printer 16. First processor system 30 is also preferably in circuit communication with second processor system 32 via at least one bus, preferably a control/status bus 42. As with the other buses, virtually any bus protocol can be used for control/status bus 43: slow data rate buses (such as IEEE-488 or asynchronous serial communication serial links), VMEbus, CompactPCI Bus, the proposed VME640 bus, other low voltage differential signaling (LVDS) parallel input/output (I/O) buses, and other high-speed parallel buses. The CompactPCI Bus is preferred for the control/status bus 42.

Figure 3:
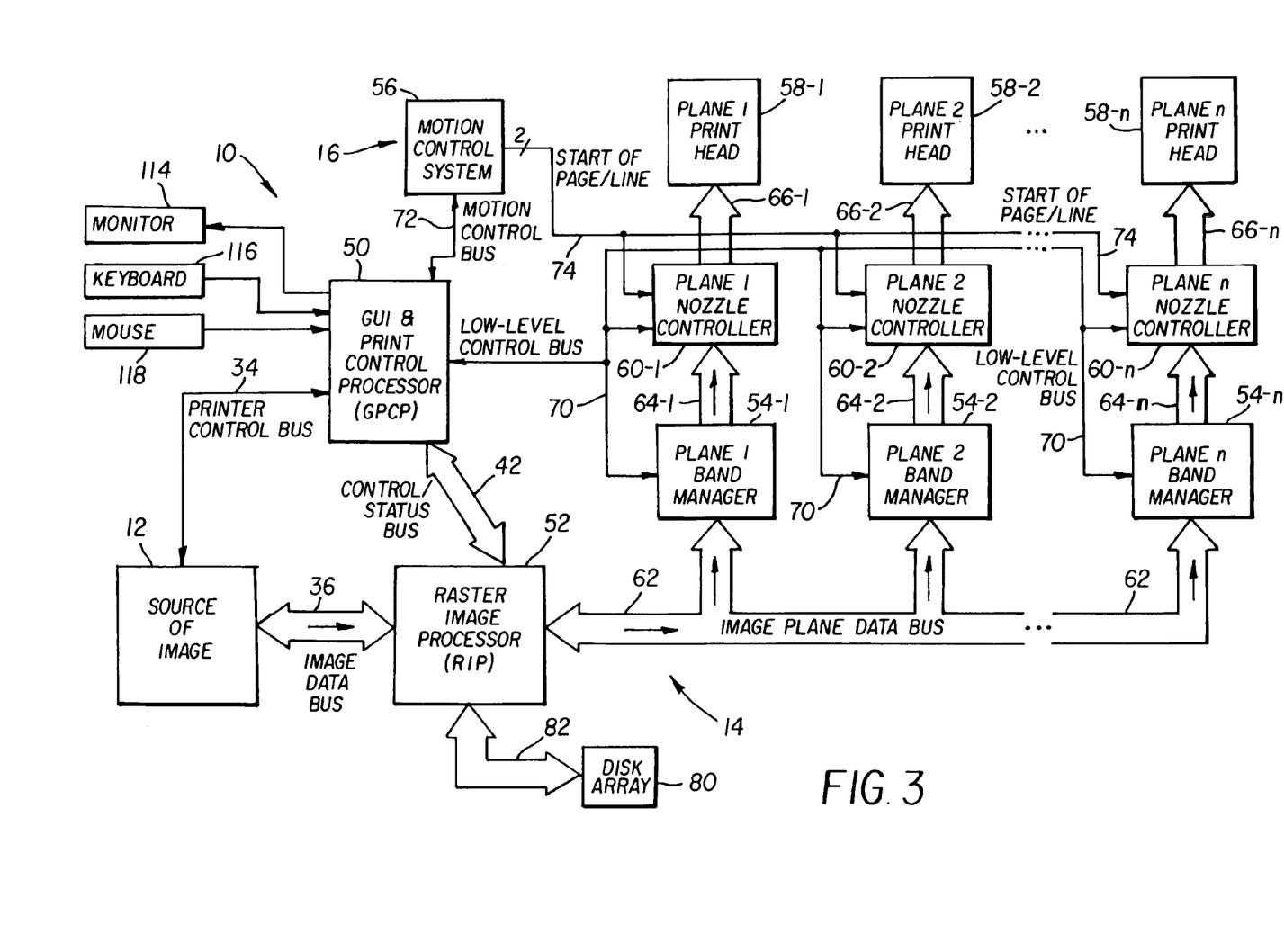
FIG. 3 is a high level block diagram showing more detail about the image processor of the present invention.

Referring now to FIG. 3, different aspects of the image processor 14 of the present invention are shown. In FIG. 3 the printer 16 comprises a multi-head ink jet printer 16. In comparison with FIG. 2, the first processor system 30 of FIG. 2 preferably comprises a GUI and Print Control Processor (GPCP) 50 of FIG. 3. The second processor system 32 of FIG. 2 preferably comprises a raster image processor (RIP) 52 in circuit communication with a plurality of parallel processors, referred to as band managers 54, in FIG. 3. N such parallel band managers 54-1, 54-2, and 54-n are shown in FIG. 3. The printer 16 of FIG. 2 preferably comprises a motion control system 56 and plurality of print heads 58 in FIG. 3. Although the printer 16 of FIG. 2 can also comprise a plurality of nozzle controllers 60 in FIG. 3, those nozzle controllers 60 are preferably part of the second processor system 32 in FIG. 2.

Preferably, the band managers 54 comprise a plurality of color plane processors and the RIP processor performs color separation of the image data into color planes (e.g., CMY or CMYK or CMYKcm) and transmits the color plane image data to the corresponding color plane processor. Each of the color plane processors preferably corresponds to one of a plurality of color planes of the image data, with each of the color plane processors processing respective color plane data received from the RIP processor to generate image output for the printer 16. Thus, in a CMY system, the band managers 54 would preferably comprise three color plane processors: a cyan color plane processor, a magenta color plane processor, and a yellow color plane processor, each of which are in circuit communication with the RIP 52. Similarly, in a CMYK system, the band managers 54 would preferably comprise four color plane processors: a cyan color plane processor, a magenta color plane processor, a yellow color plane processor, and a black color plane processor, each of which are in circuit communication with the RIP 52. Similarly, in a CMYKcm system, the band managers 54 would preferably comprise six color plane processors: a cyan color plane processor, a magenta color plane processor, a yellow color plane processor, a black color plane processor, a light cyan color plane processor, and a light magenta color plane processor, each of which are in circuit communication with the RIP 52.

The band managers 54 are preferably in circuit communication with the RIP 52 via an image plane data bus 62, across which the RIP transmits image data for each color plane to the respective color data path. As with the image data bus 36, virtually any bus protocol can be used for the image plane data bus 62. However, because RIPed image files can be very large, speed of transfer is important between the RIP 52 and the band managers 54. Therefore, faster buses are preferred for the image plane data bus 62, such as VMEbus, CompactPCI Bus, and the proposed VME640 bus. The CompactPCI bus is preferred for image plane data bus 62, implemented with a backplane and associated chassis. In this configuration, each band manager 54 is preferably implemented with a single CompactPCI Bus card inserted into the chassis and in circuit communication with the Rip via the CompactPCI Bus backplane. This shared backplane is the preferred implementation of the image plane data bus 62, regardless of the particular bus protocol selected for that bus.

In terms of distributing the image processing within the image processor 14 of the present invention, the desired image processing functions should be distributed between the RIP 52 and the band managers 54 to maximize overall image processing speed. If the band managers are color plane processors, the RIP 52 performs color separation and transmits color-separated image data to each of the corresponding color plane processor 54. Other than that one function, which must be performed upstream of the color plane processors 54, each color plane processor 54 can perform the desired image processing functions needed to maximize image throughput, e.g., any combination or permutation of print masking, image resizing, ink depletion, printer calibration, printer color conversion, dithering, registration, and failed nozzle correction, with the RIP performing the balance of the desired functions. Virtually any combination and permutation of those functions can be performed by the RIP 52 and/or by the color plane processors 54 and/or by the RIP 52 together with the color plane processors 54. In the preferred embodiment, the RIP 52 performs the image processing functions of image resizing, ink depletion, printer calibration, printer color conversion, dithering, and color separation, and the color plane processors (band managers 54) perform the image processing functions of print masking, registration, and failed nozzle correction.

Each of the band managers 54 is in circuit communication with a nozzle controller 60 via at least one bus 64. The nozzle controllers 60 create nozzle command data from the image pixel data transferred from its respective band manager 54 via bus 64. Each nozzle controller 60 is in circuit communication with at least one print head 58. The nozzle command data is communicated from the nozzle controller 60 to the print head via at least one bus 66. Buses suitable for bus 66 include either discrete lines carrying discrete signals, discrete lines carrying serialized data, or discrete lines carrying multiplexed signals (which would have to be demultiplexed by the print heads 58). Examples include FibreChannel and LVDS. Serialized TTL logic format signals or LVDS formatted data are currently preferred for bus 66 between nozzle controllers 60 and print heads 58.

The GUI and print control processor (GPCP) 50 is preferably in circuit communication with the raster image processor (RIP) 52, the band managers 54, the motion control system 56, and the nozzle controllers 60. The GPCP 50 is in circuit communication with the RIP 52 via the control/status bus 42, discussed above. The GPCP 50 is in circuit communication with the band managers 54 and the nozzle controllers 60 via a low-level control bus 70. As with the other buses, virtually any bus can be used for low-level control bus 70. However, the low-level control bus 70 is preferably a particularly slow, multi-drop bus such as the Universal Serial Bus (USB), an asynchronous serial communication serial link, or an IEEE-488 bus, or an IEEE-1149.1 bus (JTAG). USB is presently preferred for the low-level control bus 70. The GPCP 50 is in circuit communication with the motion control system 56 of printer 16 via a motion control bus 72. As with the low-level control bus 70, the motion control bus 72 can be virtually any bus, although a particularly slow, multi-drop bus is preferred such as the Universal Serial Bus (USB), an asynchronous serial communication serial link, or an IEEE-488 bus, or an IEEE-1149.1 bus (JTAG). An asynchronous serial communication serial link is presently preferred for the motion control bus 72.

The motion control system 56 also is preferably in circuit communication with each of the nozzle controllers 60, preferably with a pair of discrete lines carrying a pair of discrete signals 74: Start of Page and Start of Line. These two signals are used by the nozzle controllers 60 to synchronize nozzle commands with the medium upon which the image is being printed, as known to those skilled in the art.

The raster image processor 52 is also preferably in circuit communication with a mass storage unit for temporary storage of image data from the image source 12, such as disk array 80, via a suitable bus, such as disk control bus 82. There are many storage unit options available for disk array 80, for example: (1) a "garden variety" disk drive, e.g., a Quantum Fireball disk drive with data access rates of 10.7 Megabytes per second, which is the most economically priced technology; (2) a "striped SCSI" disk drive with data access rates at 40 Megabytes per second, (3) an "Ultra 80" RAID (redundant array of independent disks) disk drive at 80 megabytes per second, and (4) a "Ultra 160" RAID disk drive with data access rates at 160 Megabytes per second, which is the highest-performing and most expensive technology currently available. The particular technology selected for disk array 80 will depend on the particular application to which the system is directed.

Figure 4:
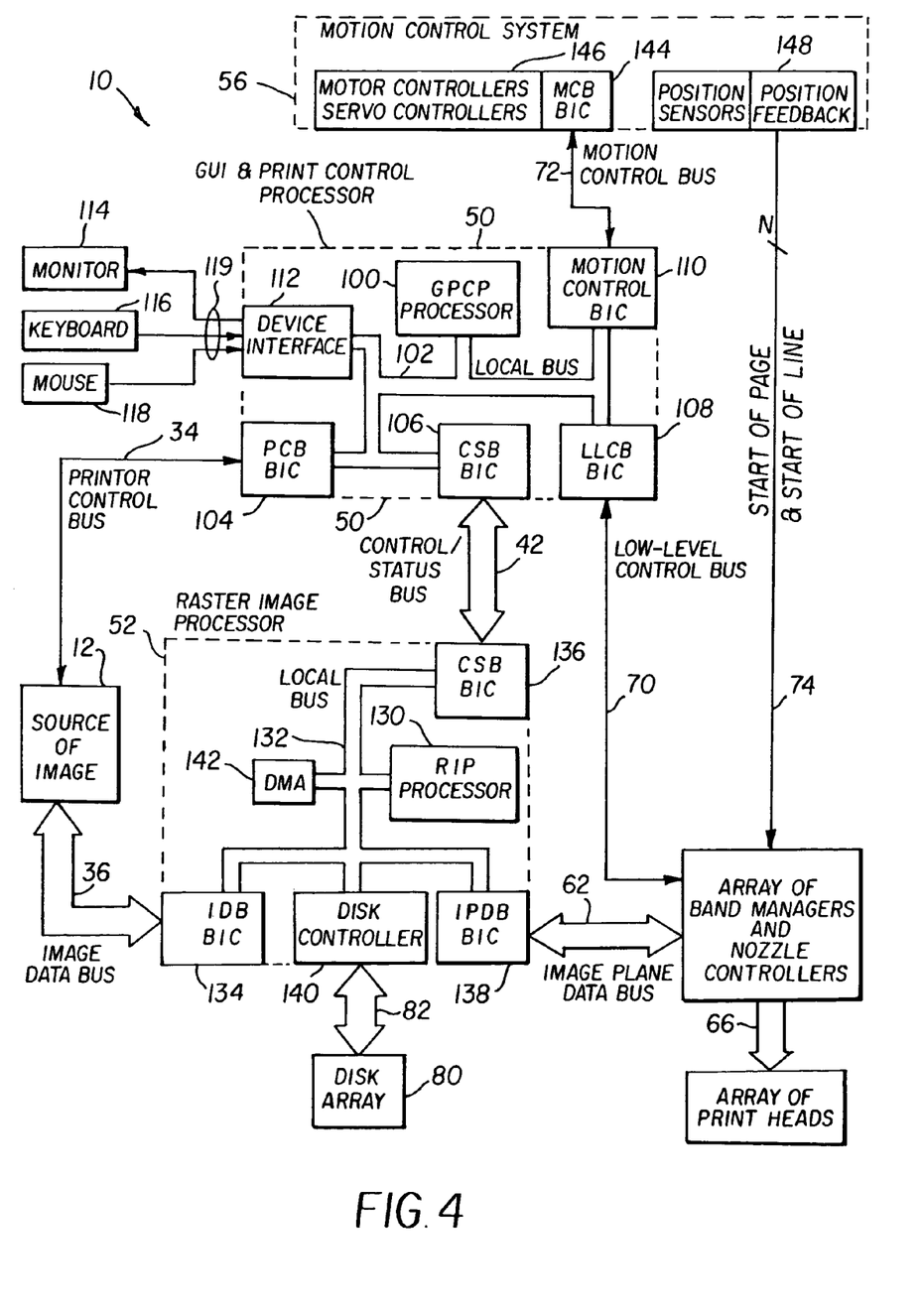
FIG. 4 is a schematic block diagram showing more detail about the GUI and print control processor (GPCP) and raster image processor (RIP) of the image processor of the present invention.

Referring now to FIG. 4, additional aspects of the GPCP 50, the RIP 52, and the motion control system 56 are shown. The GPCP 50 preferably comprises a processor system comprising an embedded GPCP processor 100 having an associated local bus 102 for placing the GPCP processor 100 in circuit communication with various devices. The GPCP processor 100 has associated therewith, either internally thereto or externally in circuit communication therewith, associated RAM, ROM, clocks, decoders, memory controllers, interrupt controllers, etc. (all not shown) known to those in the art to be needed to implement the particular GPCP processor 100 in the GUI and print control processor 50. The GPCP processor 100 is also preferably in circuit communication with various bus interface circuits (BICs) via its local bus 102: a printer control bus (PCB) bus interface circuit (PCB BIC) 104, a control/status bus (CSB) bus interface circuit (CSB BIC) 106, a low-level control bus (LLCB) bus interface circuit (LLCB BIC) 108, a motion control bus (MCB) bus interface circuit (MCB BIC) 110, and a device interface 112. The specific technology for each BIC will depend on the particular technology chosen for each bus. These BICs allow the GPCP processor 100 to interface with the various buses and place the GPCP processor 100 in circuit communication with various devices connected to those buses. The PCB BIC 104 allows the GPCP processor 100 to interface to the printer control bus 34 and places the GPCP processor 100 in circuit communication with the image source 12 via that bus. The CSB BIC 106 allows the GPCP processor 100 to interface to the control/status bus 42 and places the GPCP processor 100 in circuit communication with the RIP 52 via that bus. The LLCB BIC 108 allows the GPCP processor 100 to interface to the low-level control bus 70 and places the GPCP processor 100 in circuit communication with the band managers 54 and nozzle controllers 60 via that bus. The motion control BIC 110 allows the GPCP processor 100 to interface to the motion control bus 72 and places the GPCP processor 100 in circuit communication with the motion control system 56 via that bus. The device interface 112 allows the GPCP processor 100 to interface to various user interface devices, such as monitor 114, keyboard 116, and various pointing devices, such as mouse, 118 and places the GPCP processor 100 in circuit communication with those devices.

It is preferable that the GPCP 50 implement a user interface that is familiar to many users. Toward that end, the GPCP 50 preferably comprises a single card so-called "IBM compatible" computer system. Cards believed to be suitable for implementing the GPCP 50 are Motorola model number CPV5300, which is a PowerPC processor-based, CompactPCI-capable computer system and Motorola model number MCPN750, which is a Pentium processor-based, CompactPCI-capable computer system.

The RIP 52 preferably comprises a processor system comprising an embedded RIP processor 130 having an associated local bus 132 for placing the RIP processor 130 in circuit communication with various devices. The RIP processor 130 has associated therewith, either internally thereto or externally in circuit communication therewith, associated RAM, ROM, clocks, decoders, memory controllers, interrupt controllers, etc. (all not shown) known to those in the art to be needed to implement the particular RIP processor 130 in the raster image processor 52. The RIP processor 130 is also preferably in circuit communication with various bus interface circuits (BICs) via its local bus 132: an image data bus (IDB) bus interface circuit (IDB BIC) 134, a control/status bus (CSB) bus interface circuit (CSB BIC) 136, an image plane data bus (IPDB) bus interface circuit (IPDB BIC) 138, and a disk controller 112. The specific technology for each BIC will depend on the particular technology chosen for each bus. These BICs allow the RIP processor 130 to interface with the various buses and place the RIP processor 130 in circuit communication with various devices connected to those buses. The IDB BIC 134 allows the RIP processor 130 to interface to the image data bus 36 and places the RIP processor 130 in circuit communication with the image source 12 via that bus. The CSB BIC 136 allows the RIP processor 130 to interface to the control/status bus 42 and places the RIP processor 130 in circuit communication with the GPCP 50 via that bus. The IPDB BIC 138 allows the RIP processor 130 to interface to the image plane data bus 62 and places the RIP processor 130 in circuit communication with the band managers 54 via that bus. The disk controller 140 allows the RIP processor 130 to interface to the disk array 80.

To further increase the speed of processing of the image processor 14 of the present invention, the RIP 52 also preferably has associated therewith a direct memory access (DMA) controller 142, shown in circuit communication with RIP processor 130 via local bus 132, to allow DMA accessing of data (i) from the image source 12 (via IDB BIC 134) to the disk array 80 (via disk controller 140) and (ii) from the disk array 80 (via disk controller 140) to the band managers 54 (via IPDB BIC 138).

Motion control system 56 accepts control input from the GPCP 50 via the motion control bus 72. The motion control system 56 includes a motion control bus (MCB) bus interface circuit (MCB BIC) in circuit communication with the printer motor controllers and servo controllers 146. The motion control system 56 also includes position sensors 147 in circuit communication with position feedback circuitry 148. The position feedback circuitry 148 generates Start of Page and Start of Line signals, which are used by the nozzle controllers 60 to control the timing of print head firing.

Cards believed to be suitable for implementing RIP 52 include the Motorola MCPN750 type CompactPCI Bus processor board.

Figure 5:
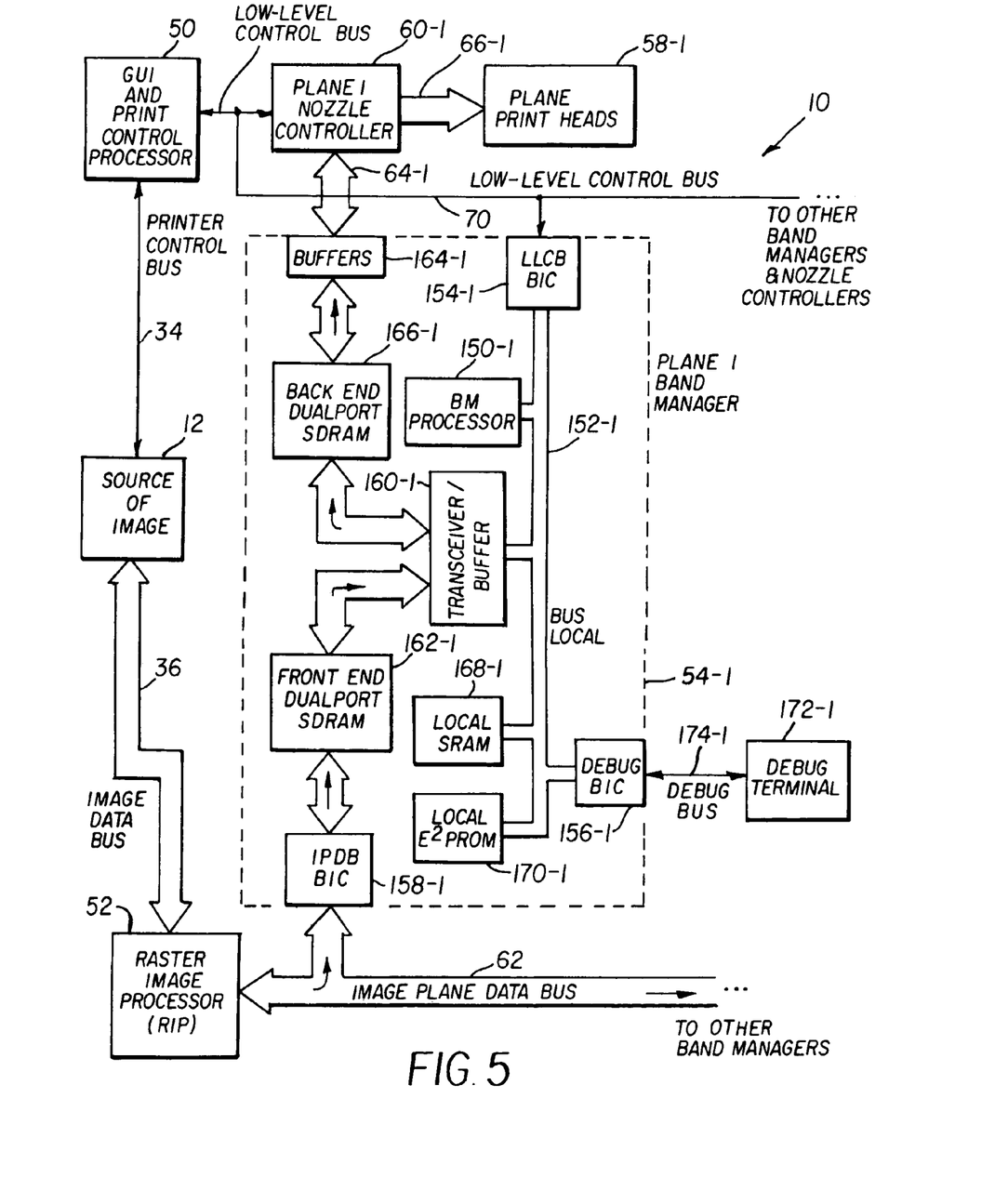
FIG. 5 is a schematic block diagram showing more detail about a representative one of the band managers of the present invention.

Referring now to FIG. 5, additional aspects of the band managers 54 are shown. FIG. 5 shows a representative band manager 54-1. The other band managers 54-2, . . . 54-*n* all preferably have the same structure as shown in FIG. 5. The band manager 54-1 preferably comprises a processor system comprising an embedded band manager (BM) processor 150-1 having an associated local bus 152-1 for placing the band manager 54-1 in circuit communication with various devices. The band manager 54-1 has associated therewith, either internally thereto or externally in circuit communication therewith, associated RAM. 168-1, ROM 170-1, clocks, decoders, memory controllers, interrupt controllers, etc. (most not shown) known to those in the art to be needed to implement the particular band manager processor 150-1 in the band manager 54-1. The band manager processor 150-1 is also preferably in circuit communication with various bus interface circuits (BICs) via its local bus 152-1: a low-level control bus (LLCB) bus interface circuit (LLCB BIC) 154-1 and a debug bus interface circuit 156-1. The band manager processor 150-1 is also preferably in circuit communication with an image plane data bus (IPDB) bus interface circuit (IPDB BIC) 158-1 via a transceiver/buffer 160-1 connected to the BM processor 150-1 via local bus 152-1 and interfacing to a front end dual-port RAM 162-1 in circuit communication with the IPDB BIC 158-1. The band manager processor 150-1 is also preferably in circuit communication with a buffer 164-1 via the transceiver/buffer 160-1 and interfacing to a back end dual-port RAM 166-1 in circuit communication with the buffers 164-1. The specific technology for each BIC will depend on the particular technology chosen for each bus. These BICs allow the band manager processor 150-1 to interface with the various buses and place the band manager processor 150-1 in circuit communication with various devices connected to those buses. The LLCB BIC 154-1 allows the BM processor 150-1 to interface to the low-level control bus 70 and places the BM processor 150-1 in circuit communication with the GPCP processor 100 within the GPCP 50 via that bus. The debug BIC allows the band manager processor 150-1 to interface to a debug terminal 172-1 via a debug bus 174-1 and places the band manager processor 150-1 in circuit communication with the debug terminal 172-1 via that bus. The PROM 170-1 of band manager has programmed therein a debug routine, known to those skilled in the art, to interface with the debug terminal 172-1 and allow debugging to be done via that terminal 172-1. The IPDB BIC 158-1 allows the BM processor 150-1 to interface to the image plane data bus 62 and places the BM processor 150-1 in circuit communication with the RIP processor 132 within the RIP 52 via that bus.

The front end dual-port RAM 162-1, the transceiver/buffer 160-1, and the IPDB BIC 158-1 are placed in circuit communication so that one port of the front end dual-port RAM 162-1 may be accessed from the image plane data bus via IPDB BIC 158-1 while the other port of the front end dual-port RAM 162-1 may be accessed by the BM processor 150-1 via the transceiver/buffer 160-1. Similarly, the back end dual-port RAM 166-1, the transceiver/buffer 160-1, and the buffers 164-1 are placed in circuit communication so that one port of the back end dual-port RAM 166-1 may be accessed by the nozzle controller 60-1 via buffers 164-1 while the other port of the back end dual-port RAM 166-1 may be accessed by the BM processor 150-1 via the transceiver/buffer 160-1. Both the front end dual-port RAM 162-1 and the back end dual-port RAM 166-1 are used in a double-buffering configuration. That is, the front end dual-port RAM 162-1 and the back end dual-port RAM 166-1 are divided into at least two portions, with at least one portion being written to through the one port while the other portion is read from through the other port. This allows the circuitry of FIG. 5 to process four images contemporaneously (see also FIG. 8): (i) a first image is downloaded from the image source 12 to the RIP 52; (ii) a second image is RIPed by the RIP 52 and transmitted to the band managers 54 (i.e., to one portion of the front end dual-port RAM 162-1); a third image is read from portion of the front end dual-port RAM 162-1, processed by the band managers 54, and written to one portion of back end dual-port RAM 166-1; and (iv) a fourth image is read by the nozzle controllers 60 from the other portion of back end dual-port RAM 166-1, and processed into nozzle control data to drive the print heads 58-1.

Cards believed to be suitable for implementing the band managers 54 include the Motorola CPV5300 type CompactPCI Bus processor board.

Figure 6:
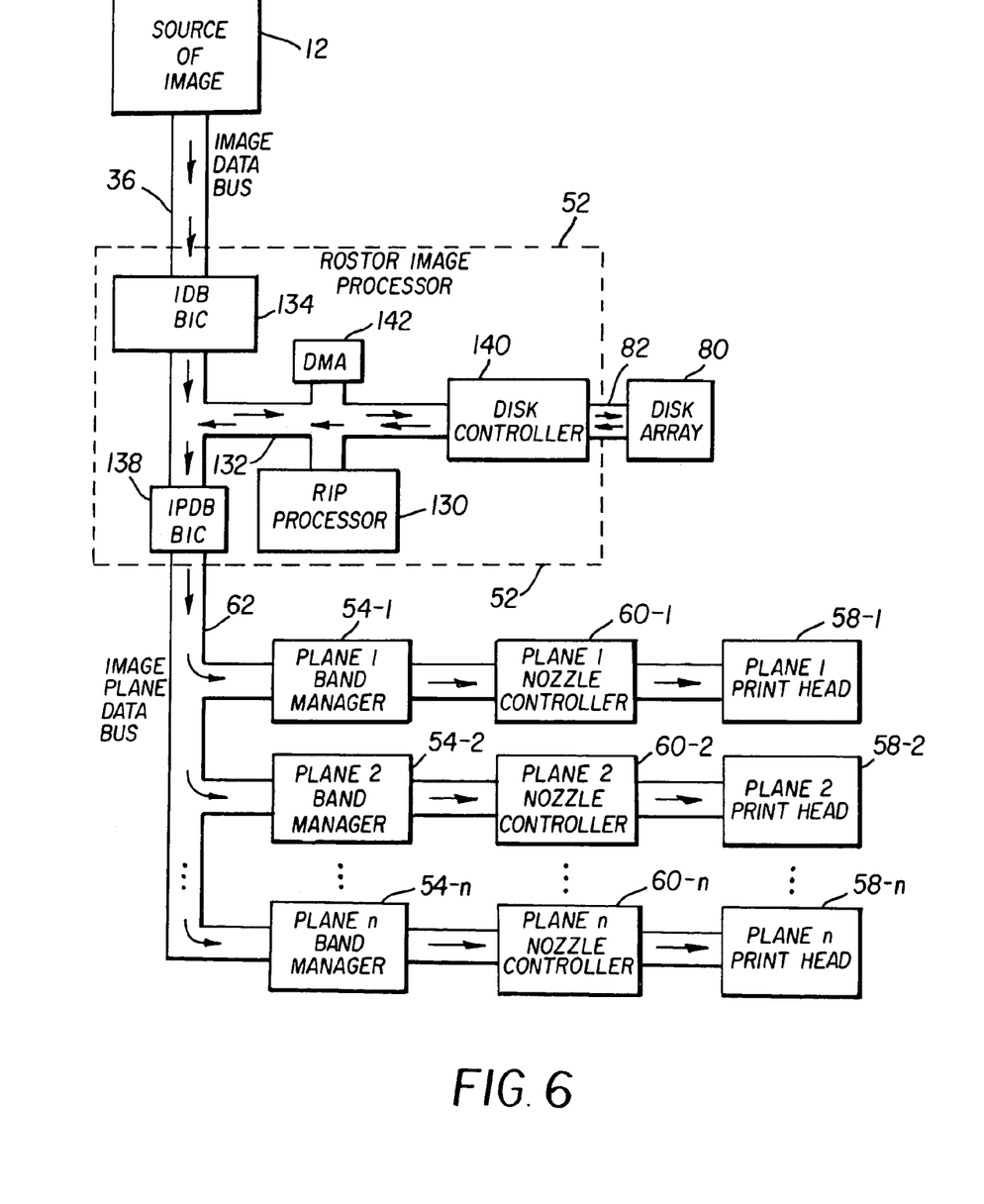
FIG. 6 is a flow path diagram showing the major image data flow paths in the image processor of the present invention.

Referring now to FIG. 6, the primary image data path is shown. As discussed above, in the broadest terms (FIG. 2), this path extends from the image source 12, to the second processor system 32, to the printer 16. In the context of FIG. 3, this path extends from the image source 12, to the RIP 52, to the separate band managers 54, to the nozzle controllers 60, to the print heads 58. In the context of FIG. 6, this path extends from the image source 12 to the IDB BIC 134, to the disk controller 140, to the disk array 80, back to the disk controller 140, to the IPDB BIC 138, to the band managers 54, to the nozzle controllers 60, to the print heads 58.

Figure 7:
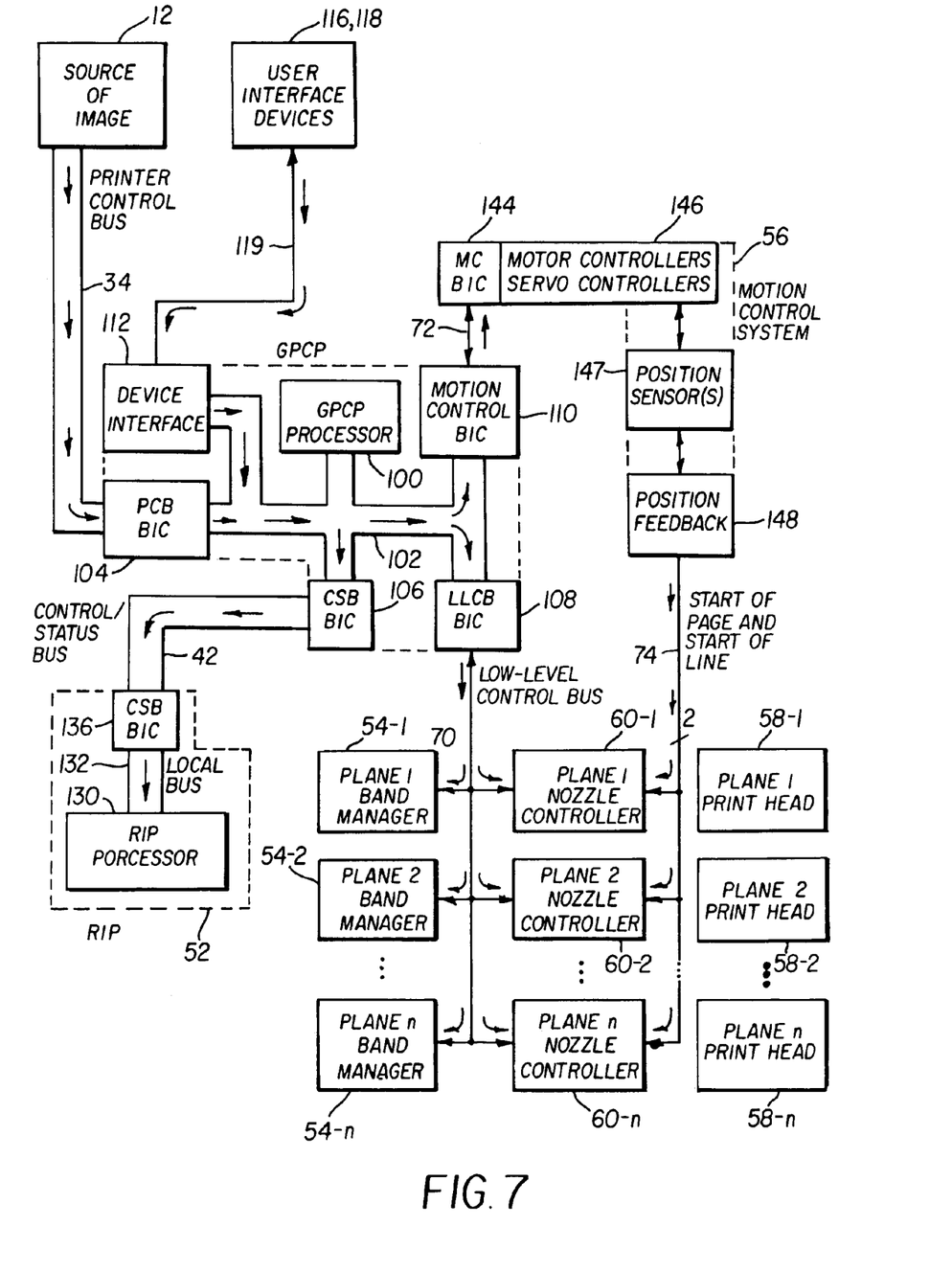
FIG. 7 is a flow path diagram showing the major control and status flow paths in the image processor of the present invention.

Referring now to FIG. 7, the primary control paths are shown. In the context of FIG. 2, these paths extend from the image source 12 to the first processor system 30, to the printer 16. In the context of FIG. 3, these paths extend from the image source 12 to the GPCP 50 and then from the GPCP 50 (i) to the motion control system 56, to the nozzle controllers, (ii) to the band managers 54 and nozzle controllers 60 via the low-level control bus 70, and (iii) to the RIP 52 via the control/status bus 42. In the context of FIG. 7, these paths extend from the image source 12 to the PCB BIC of GPCP 50, to the GPCP processor 100, and from the user interface devices 116, 118 to the device interface 112, to the GPCP processor 100. They then extend from the GPCP processor 100 (i) to the motion control BIC 110 to the motion control system 56, with position feedback (Start of Line and Start of Page) being transmitted from the position feedback circuit 148 to the nozzle controllers 60, (ii) to the LLCB BIC 108 to the band managers 54 and nozzle controllers 60 via the low-level control bus 70, and (iii) to the GPCP CSB BIC 106 to the RIP CSB BIC 136 to the RIP processor 130. In the context of the entire system 10, the user first configures the image processor 14 using the user interface devices, monitor 114, keyboard 116, and mouse 118. This configuration would include loading of data files and specifying parameters that are used in the rendering of the image data. The parameters include user specified data values such as the gain factor to be used in the edge sharpening process, the horizontal and vertical scale factors to apply in the image resizing process, the number of levels to be output by the multitone process, etc. Data files include larger sets of data, such as an ICC profile for performing the color conversion from the colorspace of the input image to the colorspace of the printer, or the calibration lookup tables used in the printer calibration process. These files and parameters would be specified by the user during the configuration of the image processor 14.

Figure 8:
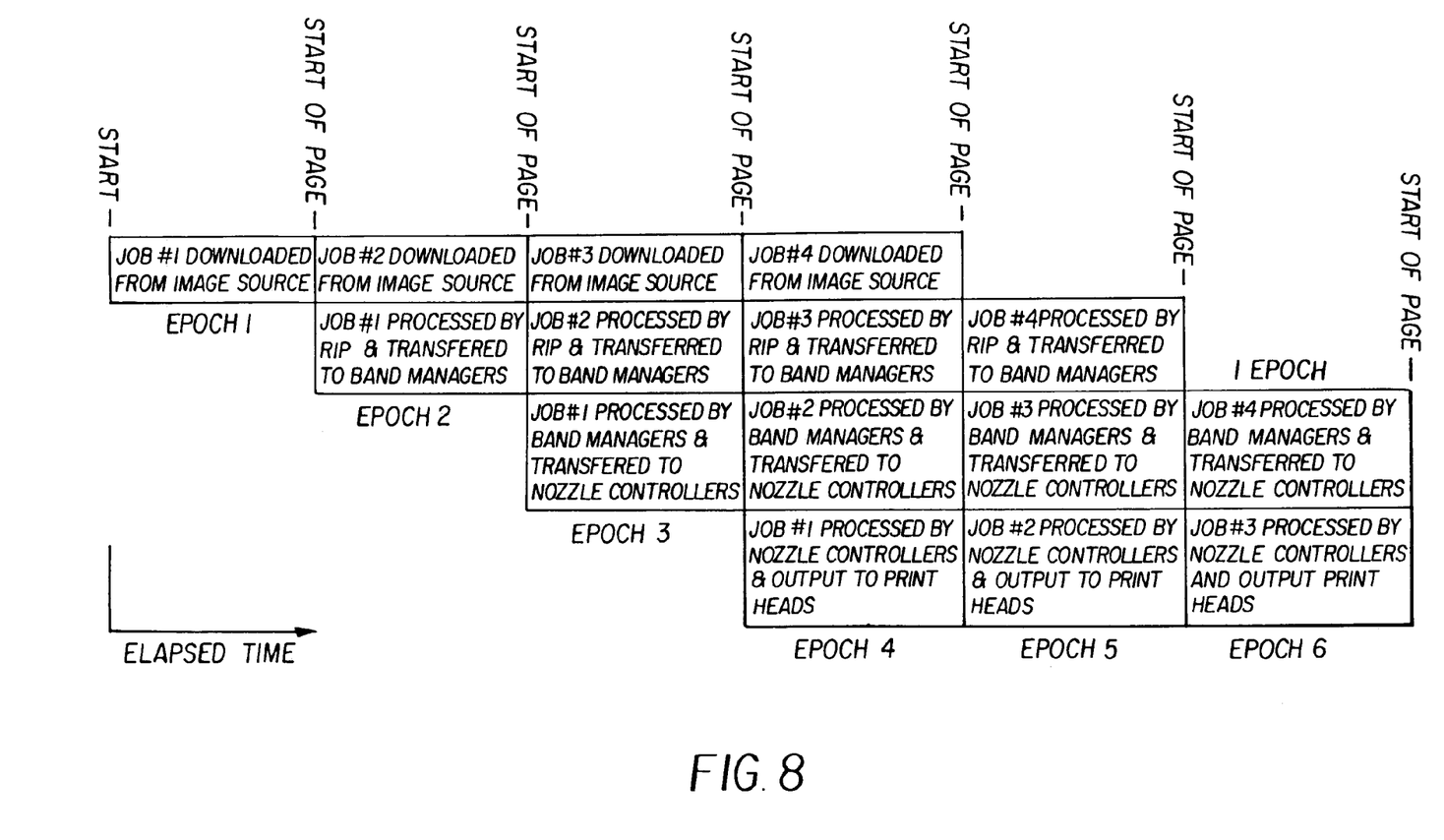
FIG. 8 is a timing diagram showing the various activities occurring during each representative processing epoch of the image processor of the present invention.
Figure 9:
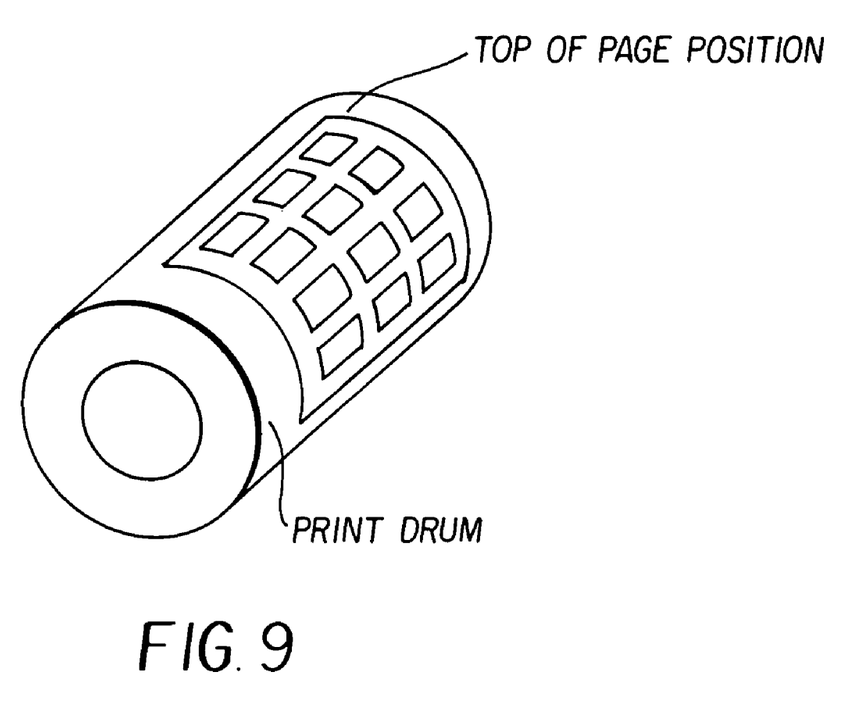
FIG. 9 is an isometric view of a print drum of a printing device showing the top (start) of page location used to synchronize the various activities in the image processor of the present invention.

After configuring the image processor 14, the user then simply sequentially downloads image files from the image source 12 to the image processor 14 for printing. With reference to FIG. 8, printing epochs are determined by the Start of Page (i.e., Top of Page in FIG. 9) signal generated by the position feedback circuit 148. During the first printing epoch, the first image file is downloaded from the image source 12 to the RIP 52. During the second printing epoch, the first image is RIPed by the RIP 52 and the color plane image data is sent to each respective band manager 54 while a second image file is downloaded from the image source 12 to the RIP 52. During the third printing epoch, the first image is processed by the band managers 54, while the second image is RIPed by the RIP 52 and the color plane image data is sent to each respective band manager 54, while a third image file is downloaded from the image source 12 to the RIP 52. During the fourth printing epoch, the first image is processed by the nozzle controllers and printed via the print heads 58, while the second image is processed by the band managers 54, while the third image is RIPed by the RIP 52 and the color plane image data is sent to each respective band manager 54, while a fourth image file is downloaded from the image source 12 to the RIP 52. This process could continue sequentially until the printer runs out of either print medium or ink. This coarse-grain pipelining allows very fast printing because tasks normally performed by the raster image processor are divided between and performed by the RIP 52 and a plurality of band managers 54. Although the printing epochs are shown in FIG. 8 and described above as being synchronized by the Start of Page signal, the Start of Page signal need not be used to control the functions performed in the first three epochs (downloading, RIP processing, and band manager processing). In the alternative, these functions can be performed as quickly as the respective processors can perform them and the data can be transferred to the next processing stage, with the last function being performed in response to the Start of Page signal or some other signal. The specific timing signals used will depend on various factors, such as whether print jobs are entire images or sections of images, etc.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. For example, the present system implementation has been tailored optimized for ink jet printers, but the present invention and the teachings herein will be helpful for other printer technologies. Therefore, the invention in its broader aspects is not limited to the specific details, representative apparatus and method, and illustrative examples shown and described. Accordingly, departures may be made from such details without departing from the spirit or scope of the applicant's general inventive concept.

PARTS LIST 10. printing system
12. image source/source of image
14. image processor
16. printer
20. bus [between image source 12 and image processor 14]
22. bus [between image processor 14 and printer 16]
30. first processor system
32. second processor system
34. printer control bus
36. image data bus
38. bus [between first processor system 30 and printer 16]
40. bus [between second processor system 32 and printer 16]
42. control/status bus
50. GUI and print control processor (GPCP)
52. raster image processor (RIP)
54. band managers (54-1, 54-2, . . . 54-n)
56. motion control system
58. print heads (58-1, 58-2, . . . 58-n)
60. nozzle controllers (60-1, 60-2, . . . 60-n)
62. image plane data bus
64. bus [between band managers and nozzle controllers] (64-1, 64-2, . . . 64-n)
66. bus [between nozzle controllers and print heads] (66-1, 66-2, . . . 66-n)
70. low-level control bus
72. motion control bus
74. start of page and start of line
80. disk array
82. disk control bus 100. GPCP processor
102. GPCP local bus
104. printer control bus (PCB) bus interface circuit (BIC)
106. control/status bus (CSB) bus interface circuit (BIC)
108. low-level control bus (LLCB) bus interface circuit (BIC)
110. motion control bus (MCB) bus interface circuit (BIC)
112. device interface
114. monitor
116. keyboard
118. mouse
130. RIP processor
132. RIP local bus
134. image data bus (IDB) bus interface circuit (BIC)
136. control/status bus (CSB) bus interface circuit (BIC)
138. image plane data bus (IPDB) bus interface circuit (BIC)
140. disk controller
142. DMA controller
144. motion control bus (MCB) bus interface circuit (BIC)
146. printer motor controllers and servo controllers
147. position feedback sensors
148. position feedback circuit
150. band manager (BM) processor (150-1, 150-2, . . . 150-*n***)
152. band manger local bus (152-1, 152-2, . . . 152-*n***)
154. low-level control bus (LLCB) bus interface circuit (BIC) (154-1, 154-2, . . . 154-*n***)
156. debug bus interface circuit (BIC) (156-1, 156-2, . . . 156-*n***)
158. image plane data bus (IPDB) bus interface circuit (BIC) (558-1, 158-2, . . . 158-*n***)
160. transceiver/buffer (160-1, 160-2, . . . 160-*n***)
162. front end dual-port SDRAM (162-1, 162-2, . . . 162-*n***)
164. buffers (164-1, 164-2, . . . 164-*n***)
166. back end dual-port SDRAM (166-1, 166-2, . . . 166-*n***)
168. band manager RAM (168-1, 168-2, . . . 168-*n***)
170. band manager PROM (170-1, 170-2, . . . 170-*n***)

What is claimed is:

1. An image processor generating image output for a printer from image data received from an image source, comprising:
   (a) a first processor system, characterized by having a first bus for communication with the image source, said first processor system communicating control data with the image source via said first bus, said first processor system further characterized by providing high-level control of the image processing performed within said image processor; and
   (b) a second processor system in circuit communication with said first processor system and characterized by having a second bus for communication with the same image source that is separate and distinct from the first bus, said second processor system receiving image data from the image source via said second bus, and said second processor system further characterized by performing a majority of the image processing performed within said image processor responsive to control by said first processor system, wherein said second processor system comprises a raster image processor (RIP) processor in circuit communication with a plurality of color plane processors, each of said color plane processors corresponding to one of a plurality of color planes of the image data, said RIP processor characterized by performing separation of the image data into color plane data for each of the plurality of color planes and transmitting color plane data for each of said color planes to said corresponding color plane processor, each of said plurality of color plane processors processing respective color plane data received from said RIP processor to generate image output for the printer.

2. An image processor according to claim 1 wherein said first processor system receives control data from the image source via said first bus.

3. An image processor according to claim 1 wherein said first processor system transmits control data to the image source via said first bus.

4. An image processor according to claim 1 wherein said RIP processor performs separation of the image data into at least cyan plane data, yellow plane data, and magenta plane data, and further wherein said plurality of color plane processors comprises a cyan plane processor in circuit communication with said RIP processor, a yellow plane processor in circuit communication with said RIP processor, and a magenta plane processor in circuit communication with said RIP processor, each of said color plane processors receiving its respective color plane data from said RIP processor;
   said cyan plane processor characterized by processing cyan plane data received from said RIP processor to generate image output for the printer;
   said yellow plane processor characterized by processing yellow plane data received from said RIP processor to generate image output for the printer; and
   said magenta plane processor characterized by processing magenta plane data received from said RIP processor to generate image output for the printer.

5. An image processor according to claim 4 wherein said RIP processor performs separation of the image data into at least cyan plane data, yellow plane data, magenta plane data, and black plane data, and further wherein said plurality of color plane processors further comprises a black plane processor in circuit communication with said RIP processor, said black plane processor receiving black plane data from said RIP processor, and said black plane processor characterized by processing black plane data received from said RIP processor to generate image output for the printer.

6. An image processor according to claim 5 wherein said RIP processor performs separation of the image data into at least cyan plane data, yellow plane data, magenta plane data, black plane data, light cyan plane data, and light magenta plane data, and further wherein said plurality of color plane processors further comprises a light cyan plane processor in circuit communication with said RIP processor and a light magenta plane processor in circuit communication with said RIP processor, each of said color plane processors receiving its respective color plane data from said RIP processor;
   (a) said light cyan plane processor characterized by processing light cyan plane data received from said RIP processor to generate image output for the printer; and
   (b) said light magenta plane processor characterized by processing light magenta plane data received from said RIP processor to generate image output for the printer.

7. An image processor according to claim 6 wherein each of said plurality of color plane processors is further characterized by performing the following functions on its respective color plane data as part of generating image output for the printer: print masking, registration correction, and failed nozzle correction.

8. An image processor according to claim 7 wherein said RIP processor performs the following functions on the image data prior to transmitting color plane data for each of said color planes to said corresponding color plane processor: print masking, image resizing, ink depletion, printer calibration, printer color conversion, and dithering.

9. An image processor according to claim 8 wherein said RIP processor is in circuit communication with said plurality of color plane processors via a common bus implemented with a backplane.

10. An image processor according to claim 1 wherein each of said plurality of color plane processors is further characterized by performing at least one of the following functions on its respective color plane data as part of generating image output for the printer: print masking, registration correction, and failed nozzle correction.

11. An image processor according to claim 10 wherein said RIP processor performs at least one of the following functions on the image data prior to transmitting color plane data for each of said color planes to said corresponding color plane processor: print masking, image resizing, ink depletion, printer calibration, printer color conversion, and dithering.

12. An image processor according to claim 1 wherein the printer comprises at least one ink jet head and said second processor system is characterized by generating image output in the form of ink jet head control signals for the at least one ink jet head.

13. An image processor generating image output for a printer from image data received from an image source, comprising:
 (a) a first processor system, characterized by having a print control bus providing a printer control and status path for communication with the image source according to a first bus protocol, said first processor system communicating control data with the image source via said print control bus, said first processor system further characterized by providing high-level control of the image processing performed within said image processor; and
 (b) a second processor system in circuit communication with said first processor system and characterized by having an image data bus providing a printer image data path separate from said printer control and status path for communication with the same image source according to a second bus protocol that is different than the first bus protocol, said second processor system receiving image data from the image source via said image data bus, and said second processor system further characterized by performing a majority of the image processing performed within said image processor responsive to control by said first processor system, wherein said second processor system comprises a raster image processor (RIP) processor in circuit communication with a plurality of color plane processors, each of said color plane processors corresponding to one of a plurality of color planes of the image data, said RIP processor characterized by performing separation of the image data into color plane data for each of the plurality of color planes and transmitting color plane data for each of said color planes to said corresponding color plane processor, each of said plurality of color plane processors processing respective color plane data received from said RIP processor to generate image output for the printer.

14. An image processor according to claim 13 wherein said RIP processor performs separation of the image data into at least cyan plane data, yellow plane data, and magenta plane data, and further wherein said plurality of color plane processors comprises a cyan plane processor in circuit communication with said RIP processor, a yellow plane processor in circuit communication with said RIP processor, and a magenta plane processor in circuit communication with said RIP processor, each of said color plane processors receiving its respective color plane data from said RIP processor;
 (a) said cyan plane processor characterized by processing cyan plane data received from said RIP processor to generate image output for the printer;
 (b) said yellow plane processor characterized by processing yellow plane data received from said RIP processor to generate image output for the printer; and
 (c) said magenta plane processor characterized by processing magenta plane data received from said RIP processor to generate image output for the printer.

15. An image processor according to claim 14 wherein said RIP processor performs separation of the image data into at least cyan plane data, yellow plane data, magenta plane data, and black plane data, and further wherein said plurality of color plane processors further comprises a black plane processor in circuit communication with said RIP processor, said black plane processor receiving black plane data from said RIP processor, and said black plane processor characterized by processing black plane data received from said RIP processor to generate image output for the printer.

16. An image processor according to claim 15 wherein said RIP processor performs separation of the image data into at least cyan plane data, yellow plane data, magenta plane data, black plane data, light cyan plane data, and light magenta plane data, and further wherein said plurality of color plane processors further comprises a light cyan plane processor in circuit communication with said RIP processor and a light magenta plane processor in circuit communication with said RIP processor, each of said color plane processors receiving its respective color plane data from said RIP processor;
 (a) said light cyan plane processor characterized by processing light cyan plane data received from said RIP processor to generate image output for the printer; and
 (b) said light magenta plane processor characterized by processing light magenta plane data received from said RIP processor to generate image output for the printer.

17. An image processor according to claim 16 wherein each of said plurality of color plane processors is further characterized by performing the following functions on its respective color plane data as part of generating image output for the printer: print masking, registration correction, and failed nozzle correction.

18. An image processor according to claim 17 wherein said RIP processor performs the following functions on the image data prior to transmitting color plane data for each of said color planes to said corresponding color plane processor: print masking, image resizing, ink depletion, printer calibration, printer color conversion, and dithering.

19. An image processor according to claim 18 wherein said RIP processor is in circuit communication with said plurality of color plane processors via a common bus implemented with a backplane.

20. An image processor according to claim 13 wherein each of said plurality of color plane processors is further characterized by performing at least one of the following functions on its respective color plane data as part of generating image output for the printer: print masking, registration correction, and failed nozzle correction.

21. An image processor according to claim 20 wherein said RIP processor performs at least one of the following functions on the image data prior to transmitting color plane data for each of said color planes to said corresponding color plane processor: print masking, image resizing, ink depletion, printer calibration, printer color conversion, and dithering.

22. An image processor according to claim 13 wherein said second processor system performing a majority of the image processing performed within said image processor responsive to control by said first processor system is characterized by having a control/status bus providing a control/status data path between said first and second processor systems.

23. An image processor according to claim 22 wherein the control/status data path is separate from both said printer control and status path and said printer image data path.

24. An image processor according to claim 13 wherein the image data bus provides a greater speed of transfer than the print control bus.

* * * * *